(12) United States Patent
Eves et al.

(10) Patent No.: US 8,721,445 B2
(45) Date of Patent: May 13, 2014

(54) AMBIENT ENVIRONMENT EFFECTS

(75) Inventors: David A. Eves, Eindhoven (NL); Richard S. Cole, Eindhoven (NL); Daniel J. Callaway, Eindhoven (GB)

(73) Assignee: AMBX UK Limited, Redhill, Surrey (GB)

( * ) Notice: Subject to any disclaimer, the term of this patent is extended or adjusted under 35 U.S.C. 154(b) by 859 days.

(21) Appl. No.: 12/305,124

(22) PCT Filed: Jul. 2, 2007

(86) PCT No.: PCT/IB2007/052563
§ 371 (c)(1), (2), (4) Date: Dec. 16, 2008

(87) PCT Pub. No.: WO2008/007293
PCT Pub. Date: Jan. 17, 2008

(65) Prior Publication Data
US 2009/0176569 A1 Jul. 9, 2009

(30) Foreign Application Priority Data
Jul. 7, 2006 (EP) ..................... 06116779

(51) Int. Cl.
*A63F 13/00* (2006.01)
(52) U.S. Cl.
USPC ............................................. 463/40
(58) Field of Classification Search
USPC ................................. 463/40, 43
See application file for complete search history.

(56) References Cited

U.S. PATENT DOCUMENTS

| | | | |
|---|---|---|---|
| 6,542,160 B1* | 4/2003 | Abgrall | 345/537 |
| 2002/0169012 A1* | 11/2002 | Eves et al. | 463/1 |
| 2002/0169817 A1 | 11/2002 | Eves et al. | |
| 2006/0038833 A1* | 2/2006 | Mallinson et al. | 345/633 |
| 2006/0227625 A1* | 10/2006 | Chiu et al. | 365/189.01 |
| 2007/0106811 A1* | 5/2007 | Ryman | 709/230 |

FOREIGN PATENT DOCUMENTS

KR 2003026499 A * 4/2003

OTHER PUBLICATIONS

English version of KR2003026499A, translated Jun. 16, 2011.*

* cited by examiner

*Primary Examiner* — Thomas L Dickey
(74) *Attorney, Agent, or Firm* — Burns & Levinson LLP; Bruce D. Jobse, Esq.

(57) ABSTRACT

An ambient effects system and method of operation is described in which regions (30, 38) of a game or movie screen (10) are analyzed (32, 40). The result of the analysis is then processed using logical, heuristic, or a combination of both techniques to determine a content related event. An ambient effects script (34, 36, 48) is then selected (if pre-authored) or generated (if not pre-authored) on the basis of the determination, and provided to the system to render appropriate ambient effects throughout the users environment. Hence, immersive, ambient effects are enabled for media or game content created independently of, and without, the ambient effects system in mind.

11 Claims, 2 Drawing Sheets

AMBIENT ENVIRONMENT EFFECTS

This application is a national phase application of and claims priority to PCT/IB2007/052563, filed Jul. 2, 2007, which claims priority to European Application No. 06116779.7, filed Jul. 7, 2006, the disclosures of which are incorporated herein in their entirety, for all purposes.

This invention relates to apparatus and methods for providing real world visual cues to a user. In particular this invention relates to apparatus adapted to deliver effects in a real world room related to regional areas of a virtual world environment. The invention has particular, but not exclusive, application to computer gaming and home theatre systems.

Patent application WO 02/092183 describes a real world representation system and language in which a set of devices are operated according to a received real world description and hence render the real world experience to the user. For example, the devices may output effects such as visible colour tones and luminance levels onto the walls of a private dwelling, fans and heaters may cool and heat, and active furniture may shake or vibrate in synchronicity with media content and in dependence on the received description. The description may be embedded or provided with a broadcast signal thereby linking the description to audio/visual or other media content within the broadcast. Hence an ambient immersive environment is created, which is flexible, scalable and provides an enhanced experience to a user.

Patent application WO 02/092182 in particular describes the application of the concepts described in WO 02/092183 in a gaming environment thereby rendering in the real world, in real time, effects related to the game world model displayed for example on a display. Effects such as lighting levels, (relative/absolute, moods, colours, position, focus) and mood—emotional, ambient, animated and so on are disclosed. In one example, the real-world description reads <FOREST>, <SUMMER>, <EVENING>, which is interpreted into specific instructions relating to the colour tones and luminance level required, such as a colour tone of a pleasant green and the light level low but warm.

Hence, such an environment in the game world may be rendered in the real world providing an enhanced game playing experience. Such an "ambient experience" system is, at the time of writing, under commercial development under the registered trademark amBX® (ambient experience).

The aforementioned amBX systems usually involve a scripting language interpreted by middleware such as an "amBX software engine", which then relays the appropriate commands to the devices through device drivers or a hardware abstraction layer (HAL) for example. Such systems require the high level descriptive script associated with the virtual game world, and events therein, to be "built into" the virtual game-world. In essence, the game and amBX developer must incorporate the script at the time of authoring the source computer code for the game. Clearly, access to the source code of a commercial computer game (or to a video disc master carrying an encoded Hollywood movie or film) is usually prohibited for copyright reasons.

Such direct authoring enables sophisticated and synchronised effects, according to the authors' creative view on the mood and feeling that should be projected, to occur at particular points or events within the media.

However, there remains a desire to provide some ambient environment effects for computer games or film media owned by a consumer (or the back catalogues of publishers and studios), which were not authored together with ambient script or other code, or for which no access to the original code is provided.

According to a first aspect of the invention, there is provided a method for providing ambient effects in relation to displayed media content, comprising capturing in a buffer memory the screen contents for display, analysing the contents of at least one defined region of the captured screen contents to produce a value for the region, processing the value to determine a content event, selecting an effects script based on the determined event, and providing the selected effects script to render ambient effects.

According to a second aspect of the invention there is provided a system for providing ambient effects in relation to displayed media content, comprising at least one ambient effects device adapted to communicate with a computer (10) adapted to display media content on a display device (10), characterised in that the computer is adapted to capture in a buffer memory the screen contents for display, to analyse (32, 40, 46, 52) the contents of at least one defined region (30, 38, 44, 50) of the captured screen contents to produce a value for the region, to process the value to determine a content event, to select an effects script based on the determined event, and to provide the selected effects script (34, 36, 42, 48, 54) to the ambient effects device to render ambient effects.

In yet a further aspect of the invention, program code on a carrier is provided, the code when executed causing a computer to perform the aforementioned method aspect.

Owing to the invention, it is possible to provide ambient effects in relation to content specific events associated with the media content. The event may represent a media content state which persists (for example, a blue sky indicating daylight state) in relation to a temporally limited content event such as a lightning flash.

Typically, the graphical user interface (GUI) of a computer game often has several well defined graphical objects rendered in particular regions of the game screen. Such objects may represent a player's health, a players score, and so on.

In an embodiment, a graphical object representing a wind direction, often found in flight simulators, is displayed in a region of the displayed screen. Analysis of the region, and processing of the results of that analysis determines the content event comprising the state of the in-game wind direction. This determination is then employed to select an appropriate effects script representing that event, such as <WIND E>. The provision of the effects script to the system then causes a fan device, situated in the room of the game player, at a location in the room representing East, to operate, providing an easterly ambient wind effect in association with the determined game event. The state of the strength or power of the virtual wind may also be analysed and processed, and the fan operated accordingly.

In another embodiment, lighting devices render appropriate luminance and colours within the ambient environment in dependence on a region of the screen displaying a player character's health. The walls of the environment may for example be washed with colour that alters in luminance and colour as the characters health is depleted. A strong red colour, determined as a warning event, results in the selection of a <WARNING, RED> script, which causes the lighting devices to bathe the room in pulsing red light to indicate the event. In addition, a clean blue or green colour event may indicate good health, with appropriate scripts being selected and provided to augment the gaming experience of the player In another embodiment, control buttons or indicators provided in a game GUI, change colour or flash to indicate an in-game event such as new information available, incoming communication and so on. Analysis routines which analyse the appearance of the regions of the display that contain such buttons and indicators are then employed, together with heuristic techniques, to select and provide content event specific ambient environment effects. Active furniture may rumble under the game playing user, and lighting effects may be employed to further the game experience, and increase the sense of immersion the user perceives.

In another embodiment, reward scripts may be selected upon appropriate processing determination of such content events.

Multicolour LED lamps and "wall washers", as known to those skilled in the lighting art, are particularly suited for such purposes, with the capability of bathing the environment with an ambient colour and luminance across the full colour gamut.

The method aspect is also applicable to non-GUI related content specific regions. For example, sky or ground regions may be processed, with the result that appropriate scripts are selected to provide matching <SKY, BLUE> and <GROUND, RED> lighting effects, or at a simpler level simply indicating a content state of whether it is dark or night-time, or light and daytime in the virtual world. Such schemes may also be employed with movie or film content, giving at least some ambient experience in relation to the content being displayed.

Advantageously, multiple regions may be analysed and events determined accordingly. Furthermore, the analysis of multiple regions may be combined with logic based rules and/or heuristic reasoning techniques (fuzzy logic, neural networks and the like) to provide a particular script and ambient effect.

The regions themselves can overlap, be subsets of one another, be irregular in shape or outline, or may represent certain predefined pixel combinations. The regions may be predefined, or they may be automatically determined using pattern recognition, or by user input.

Further optional features will be apparent from the following description and accompanying claims.

Embodiments of the invention will now be described, by way of example only, with reference to the accompanying drawings, in which.

Figure 1:
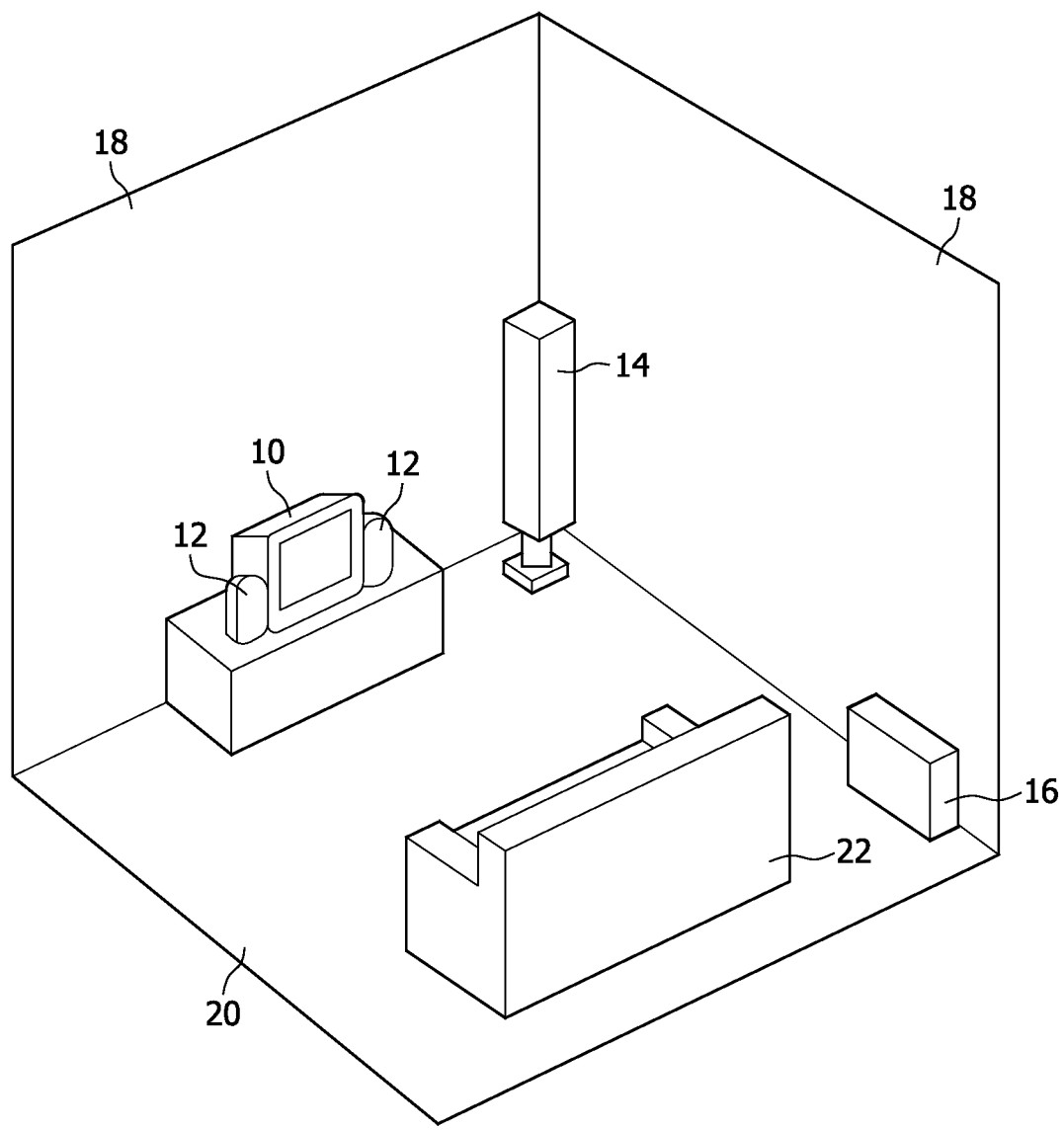
FIG. 1 illustrates an ambient experience system embodiment.

FIG. 1 illustrates an ambient experience system comprising a set of devices including a computer with display device 10, audio speakers 12, a lighting device 14, a heating or cooling (fan) device 16, walls 18, and floor 20. These devices together contribute to make up the ambient environment, each device being arranged to provide one or more ambient effects. For example, the lighting device 14 contributes colour tones as well as to the luminance level. The devices may be electronic or they may be purely mechanical. The devices are interconnected by either a wireless network or a wired network such as a powerline carrier network. Of course the environment may also include active furniture 22 fitted with rumblers, vibrators and/or "shakers". The computer in this embodiment is a so-called "media-PC" enabling computing, gaming and audio/video home theatre applications.

At least one of the devices making up the ambient experience system is arranged to receive an effects script in the form of an instruction set of a mark-up language (although other forms of script may also be employed by the skilled person), the device(s) being operated according to said script. In this example, the script augments the experience of a computer game that a user is playing on computer and display 10.

For a full description of the general aspects of operation of such an ambient environment system and effects scripting language, the reader is directed to published patent applications US2002/169817 and US 2002/169012. The interested reader is further directed to www.ambx.com where more information and video demonstrations of the amBX® system are available.

In this embodiment, and in contrast to the prior art systems referenced above, the computer game being executed and displayed by computer 10 does not have effects scripts embedded in its computer code. Hence, no effects from the ambient devices would normally be generated upon the playing of the game. However, novel software provided to the computer 10 enables ambient effects to be rendered in the room, as will now be described with reference to FIG. 2.

Figure 2:
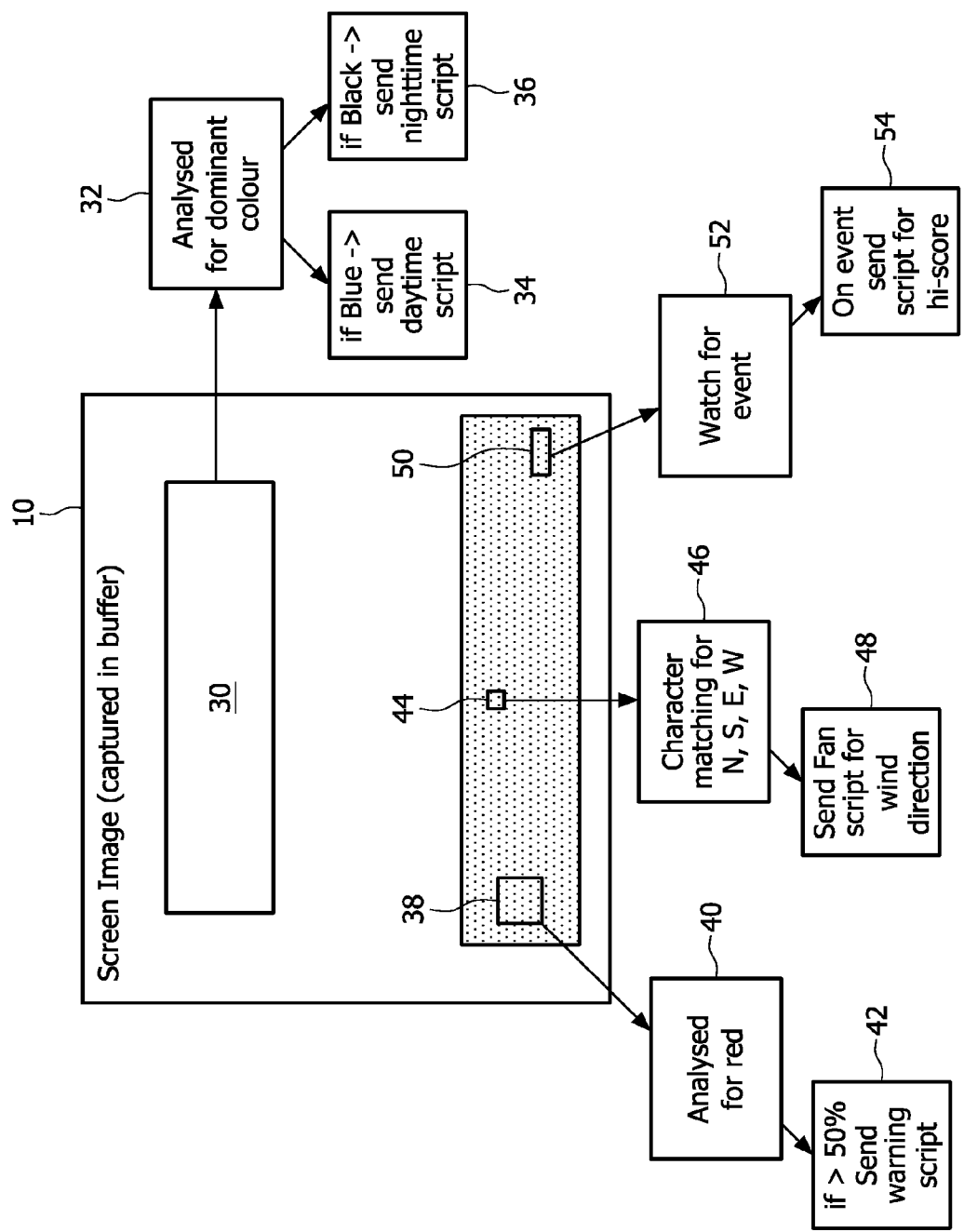
FIG. 2 is a diagram showing screen regions and effects.

FIG. 2 schematically illustrates a screen image for display by computer and display 10. Program code provided on a carrier such as a memory card or an optical disc or a download signal is loaded into the computer. The code causes the screen image or contents (i.e. actual pixel values) to be captured before display in a memory buffer of the computer using known graphical techniques, such as video frame buffer interception for example.

Subsequently, the processor executes code embodying an analysis algorithm to analyse at least one region 30 of the captured video frame. The algorithm in this embodiment analyses the region to produce a value, such as a dominant colour value 32. For example, and as shown at result 34, the dominant colour value analysis yields a value representing a predominantly blue colour. A predefined rule is then applied to the value to determine a content event which then directs the selection of an appropriate ambient effects script. The rule in this case comprises testing whether the value falls within a certain range of values. If TRUE, then a content event "DAYTIME" is determined. The computer then selects a script associated with that "DAYTIME" event, and provides the selected script to the amBX engine code installed on the computer 10. The engine interprets the script and subsequently operates at least one or more of the devices 10, 12, 14, 16, 18, 20 of the system to render daytime ambient effects.

Alternatively, the analysis 32 may produce a value which represents a dark or predominantly black screen region 30. The rule is then applied, and determines a "NIGHT-TIME" content event. Hence, a different script associated with that event is selected.

In another embodiment, other regions 38, 44 and 50 associated with the GUI are analysed together. As shown in the Figure, a health status indicator region 38 is analysed 40 for colour or level content value, with appropriate <WARNING> scripts being provided in dependence on the event determination "warning". In this example, a rule which tests for values indicating health below 50% and a red colour is applied, the result if TRUE triggering the selection of a <WARNING> script. This script is then provided to the amBX engine code installed on the computer 10. The engine interprets the <WARNING> script and subsequently operates at least one or more of the devices 10, 12, 14, 16, 18, 20 of the system to render <WARNING> ambient effects.

Similarly, an object associated with an event in the game (for example incoming communication or "high score") may be analysed as a region 50 to produce a value of 1 or 0. Subsequently, a rule is applied to the value and tests for TRUE or FALSE values indicating the presence or not of the event, and an appropriate script (such as a <HI-SCORE> script associated with the rule) is selected and provided 54 to the system engine to render appropriate ambient effects throughout the ambient environment. Note that as little as one pixel value may be analysed to indicate the presence of an event.

Alternatively, or in addition, complex pattern recognition algorithms 46 may be employed in the analysis to produce a value.

As an example of more complex analysis, FIG. 2 illustrates region 44 which represents a wind direction. Pattern or character matching algorithms 46 are employed to determine the values characteristic of the direction of the wind flow in the game indicated within the region. A rule which tests the values for direction is then applied in the processing step to determine the content event or state of wind direction, and an appropriate script selected and provided 48 to control an appropriately positioned fan device 16 to render the ambient wind effect to the game player.

For example, a fan device 16 situated behind the player in his physical environment may operate 48 when the wind indicator 44 is analysed 46 to produce a value, which when processed by the rule reveals the content event of the wind in the game (virtual) environment originating from a direction representing that behind the player character (i.e. a following wind) in the game. Hence events such as "wind following", "head-wind" and so on can be coded for and determined.

In the above embodiment, the screen regions are determined by algorithm and script programmers which study the legacy game and look for certain object or information areas and events within the game. Analysis algorithms to produce values, and associated rules for determining events and selecting scripts in dependence on the events are then authored for the game.

Advantageously, only analysing those pre-determined regions during game play, enables fast, efficient analysis algorithms as redundant screen information need not be processed. Those skilled in the art will recognise that algorithms which analyse as little as one pixel in a region, together with simple TRUE or FALSE rules may be appropriate in some cases. Those skilled in the art will also recognise that complex shape or pattern recognition in irregularly arranged and perhaps overlapping regions, with more sophisticated content specific heuristic techniques are also possible, and may be employed in appropriate cases.

Furthermore, scripts for specific gaming events in specific games and their GUIs can be authored separately from the game development (which itself may have happened many years ago for legacy games). In this fashion, analysis algorithms for regions and associated content events can be tuned to specific game or movie titles, leading to complex and yet fast and efficient immersive ambient effects in synchronicity with the game environment and events, without direct or embedded in-game scripting.

Alternatively, or in addition to the above, general purpose colour or object presence detection algorithms together with heuristic techniques may also or otherwise be deployed to provide ambient effects for any game or movie to at least some level of sophistication.

In another embodiment, events detected in-game may cause the analysis algorithms, or regions analysed, to alter, creating a domino type effect of ambient effects. This enables detection to be activated or deactivated when an event such as a GUI itself is "switched" on or off in the game. In addition, multiple regions may be analysed and effects provided accordingly. Furthermore, the analysis of multiple regions may be combined heuristically to select a script to provide a particular desired effect. The regions 30, 38, 44, 50 are shown separate in the Figure, but of course in some cases the regions themselves can overlap, be subsets of one another, be irregular in shape or outline, or may represent certain predefined pixel combinations.

In the above, the regions were predefined. In yet another embodiment, the regions may be automatically determined by user input, or automatically by algorithms designed to look for score and health indicators.

In yet another embodiment, and with a view to timing constraints, it is also possible to determine content events occurring across many screen frames. Hence in-game effects such as judder (for example an event in which the earth is trembling in the game) can be translated to the ambient environment with active furniture "juddering" in sympathy with the on-screen action.

By way of example, in a flight simulation game, a different ambient effect could be provided depending on whether the view state of the in-game view presented to the player is internal or external to the aircraft. When the in-game view state is internal (say a cockpit view) then regions associated with cockpit instruments are analysed, with appropriate rules and values. The presence or not of these areas themselves could be continuously monitored to detect whether the view state changes to an external view. If it has, a new set of regions and algorithms are deployed to capture external areas which may appear in the external view such as the sky, ground and the plane propeller. Example high level code illustrating this in more detail is shown below.

```
<Zones>
    <Mode id="interior">
        <Area id="altimeter">
            <Region x1="10" y1="10" x2="20" y2="20"/>
            <Algorithm> AltimiterScanner1 </Algorithm>
        </Area>
        <Area id="tachometer">
            <Region x1="20" y1="10" x2="30" y2="20"/>
            <Algorithm> RevometerScannerF </Algorithm>
        </Area>
        <Area id="oilTempSensor">
            <Region x1="30" y1="10" x2="40" y2="20"/>
            <Algorithm> ColourScanner3 </Algorithm>
        </Area>
        <Area id="artificalHorizon">
            <Region x1="40" y1="10" x2="50" y2="20"/>
            <Algorithm> HorizonScanner3 </Algorithm>
        </Area>
    </Mode>
    <Mode id="exterior">
        <Area id="sky">
            <Region x1="0" y1="0" x2="100" y2="50"/>
            <Algorithm> ColourScanner1 </Algorithm>
        </Area>
        <Area id="skyL">
            <Region x1="0" y1="0" x2="50" y2="50"/>
            <Algorithm> ColourScanner1 </Algorithm>
        </Area>
        <Area id="skyR">
            <Region x1="50" y1="0" x2="100" y2="50"/>
            <Algorithm> ColourScanner1 </Algorithm>
        </Area>
        <Area id="ground">
            <Region x1="0" y1="0" x2="100" y2="50"/>
            <Algorithm> ColourScanner2 </Algorithm>
        </Area>
        <Area id="groundL">
            <Region x1="0" y1="0" x2="50" y2="50"/>
            <Algorithm> ColourScanner2 </Algorithm>
        </Area>
        <Area id="groundR">
            <Region x1="50" y1="0" x2="100" y2="50"/>
            <Algorithm> ColourScanner2 </Algorithm>
        </Area>
        <Area id="propeller">
            <Region x1="40" y1="40" x2="60" y2="60"/>
            <Algorithm> RotationScanner7 </Algorithm>
        </Area>
    </Mode>
```

```
</Zones>
//Mode Detector
if( interior.likelihood > exterior.likelihood ){
    MODE = interior
}
else{
    MODE = exterior
}
```

Furthermore, time based effects may be coded for based on a region indicating an aircraft height, such as an altimeter cockpit instrument. Analysing this region over time could be used to produce values which, when processed, determine a content event of whether a steep descent is occurring. If the event is occurring, then an <AIRCRACFT STEEP DESCENT WARNING> script is selected. This, when interpreted by the amBX engine, causes ambient lighting devices 14 in the players environment to produce flashing red warning lights, ambient fan or wind devices 16 to produce high speed winds whilst active furniture devices 22 simulate aircraft judder with rumblers. Example high level code illustrating this in more detail is shown below.

```
//Warning detectors
//Dive Test
if( altimeter.descentRate(10s, -1000m) ){
    EVENT_EFFECT = "AIRCRACFT STEEP DESCENT
    WARNING"
}
//Scripts
<amBX id="AIRCRACFT STEEP DESCENT WARNING">
    <FANS>
        N - HIGHSPEED
        NW - HIGHSPEED
        NE - HIGHSPEED
    </FANS>
    <RUMBLERS>
        AIRCRAFT JUDDER 3
    </RUMBLERS>
    <LIGHTS>
        FLASH RED WARNING LIGHT
    </LIGHTS>
</amBX>
```

In another example, multiple regions are analysed to produce respective values, which when processed, cause a script to be selected and provided for rendering. For example, analysing a region associated with a characters health bar and a region on the game characters body for a red splash could be used to detect a "shot damage" event, and hence to select a location specific <SHOT DAMAGE> script, which causes active furniture 22 to rumble in a specific way associated with a "Shot", and lamp devices 16 to illuminate in a way representing a gun muzzle flash from the direction within the game that the shot came from (for example from the right or left or behind the player character). Example high level code illustrating this in more detail is shown below.

```
<Zones>
    <Mode id="FirstPerson">
        <Area id="Health">
            <Region x1="10" y1="10" x2="20" y2="20"/>
            <Algorithm> QuakHealthScanner2 </Algorithm>
        </Area>
        <Area id="Ammo">
            <Region x1="20" y1="10" x2="30" y2="20"/>
            <Algorithm> QuakAmmoScanner2 </Algorithm>
        </Area>
        <Area id="Weapon">
            <Region x1="30" y1="10" x2="40" y2="20"/>
            <Algorithm> WeaponSelectorScanner </Algorithm>
        </Area>
        <Area id="HitZone1">
            <Region x1="40" y1="40" x2="50" y2="50"/>
            <Algorithm> HitScanner </Algorithm>
        </Area>
        <Area id="HitZone2">
            <Region x1="50" y1="40" x2="60" y2="50"/>
            <Algorithm> HitScanner </Algorithm>
        </Area>
        <Area id="HitZone3">
            <Region x1="40" y1="40" x2="50" y2="50"/>
            <Algorithm> HitScanner </Algorithm>
        </Area>
        <Area id="HitZone4">
            <Region x1="50" y1="40" x2="60" y2="50"/>
            <Algorithm> HitScanner </Algorithm>
        </Area>
    </Mode>
    <Mode id="Menu">
        <Area id="background">
            <Region x1="0" y1="0" x2="100" y2="100"/>
            <Algorithm> AverageColour </Algorithm>
        </Area>
        <Area id="HighScore">
            <Region x1="10" y1="10" x2="20" y2="11"/>
            <Algorithm> HighscoreDetector2 </Algorithm>
        </Area>
    </Mode>
<Zones>
//Shot & Health rules
if( Health.changes( -ve ) && ( HitScanner1.detectHit(true) ){
    EVENT_EFFECT = "HIT_NORTH_WEST"
}
if( Health.changes( -ve ) && ( HitScanner2.detectHit(true) ){
    EVENT_EFFECT = "HIT_NORTH_EAST"
}
if( Health.changes( -ve ) && ( HitScanner3.detectHit(true) ){
    EVENT_EFFECT = "HIT_SOUTH_WEST"
}
if( Health.changes( -ve ) && ( HitScanner4.detectHit(true) ){
    EVENT_EFFECT = "HIT_SOUTH_EAST"
}
if( Health.changes( +ve ){
    EVENT_EFFECT = "HEALTH_PICKED_UP"
}
//Scripts
<amBX id="HIT_NORTH_WEST">
    <RUMBLERS>
        NW - HIT_2
    </RUMBLERS>
    <LIGHTS>
        NW - GunShotFlash
    </LIGHTS>
</amBX>
<amBX id="HIT_NORTH_EAST">
    <RUMBLERS>
        NE - HIT_2
    </RUMBLERS>
    <LIGHTS>
        NE - GunShotFlash
    </LIGHTS>
</amBX>
<amBX id="HIT_SOUTH_WEST">
    <RUMBLERS>
        SW - HIT_2
    </RUMBLERS>
    <LIGHTS>
        SW - GunShotFlash
    </LIGHTS>
</amBX>
<amBX id="HIT_SOUTH_EAST">
    <RUMBLERS>
        SE - HIT_2
    </RUMBLERS>
    <LIGHTS>
        SE - GunShotFlash
```

```
        </LIGHTS>
    </amBX>
    <amBX id="HEALTH_PICKED_UP">
        <LIGHTS>
            HealthPickedUpGlow
        </LIGHTS>
    </amBX>
```

In yet a further example, a sharp breaking event of a vehicle in a game or movie is coded for. For example, a vehicle speedometer or speed indicator screen region may be analysed with rules detecting a sharp drop in the vehicle speed, together with a region displaying the vehicle tyre(s) for the presence of a sparking effect. Hence, a sharp breaking event is determined, and a <SHARP BREAKING> script selected, which causes ambient effects of a juddering rumble 22 and a sparkling light effect 14 behind the user.

Hence, a scaleable, flexible and content tailored ambient effect mechanism, limited only by the imagination of the script and heuristic/rule authors, is provided.

In the above, an ambient effects system and method of operation is described in which regions of a game or movie screen are analysed. The result of the analysis is then processed using logical, heuristic, or a combination of both techniques to determine a content related event. An ambient effects script is then selected (if pre-authored) or generated (if not pre-authored) on the basis of the determination, and provided to the system to render appropriate ambient effects throughout the users environment. Hence, immersive, ambient effects are enabled for media and game content events, the media being created independently of, and without, the ambient effects system in mind.

From reading the present disclosure, other variations and modifications will be apparent to the skilled person. Such variations and modifications may involve equivalent and other features which are already known in the art of ambient effects provision, event detection and heuristic analysis, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method for providing ambient effects in relation to displayed media content, comprising:
   a) capturing in a buffer memory of a computer screen contents for display, the screen contents generated by computer code of a computer game being executed on the computer,
   b) analyzing the contents of at least one defined region of the captured screen contents to produce a value for the region,
   c) processing the value to determine a content event,
   d) selecting an effects script based on the determined content event,
   e) providing the selected effects script to at least one of a plurality of devices contributing to make up an ambient environment, and
   f) operating the devices according to the effects script to render ambient effects.

2. A method as claimed in claim 1, wherein step b) comprises analyzing the colour value of a plurality of pixels in the region to produce a value.

3. A method as claimed in claim 1, wherein step b) comprises using pattern recognition to produce a value.

4. A method as claimed in claim 1, wherein a plurality of regions are analysed, each producing at least one respective value.

5. A method as claimed in claim 4, wherein step c) comprises using a heuristic technique applied to the plurality of respective values produced.

6. A method as claimed in claim 4, wherein step c) comprises applying a predefined rule associated with the plurality of regions to the plurality of respective values produced.

7. A method as claimed in claim 1, wherein the value produced by an analysis of the region is combined with previously produced values for that region before processing.

8. A method as claimed in claim 1, wherein step d) comprises generating the effects script based on the determined event.

9. A computer program product for use with a computer system for generating a real world description to operate a set of devices to augment a user's experience of a computer game world, the computer program product comprising a computer readable medium having program code embodied thereon, the program code comprising:
   a) program code for capturing in a buffer memory of a computer screen contents for display, the screen contents generated by computer code of a computer game being executed on the computer,
   b) program code for analyzing the contents of at least one defined region of the captured screen contents to produce a value for the region,
   c) program code for processing the value to determine a content event,
   d) program code for selecting an effects script based on the determined content event, the effects script not being embedded in the computer game code,
   e) program code for providing the selected effects script to at least one of a plurality of devices contributing to make up an ambient environment, and
   f) program code for operating the devices according to the effects script to render ambient effects.

10. A system for providing ambient effects in relation to displayed media content, comprising:
    at least one ambient effects device adapted to communicate with a computer adapted to display media content on a display device,
    the computer adapted to capture in a buffer memory screen contents for display, the screen contents generated by computer code of a computer game being executed on the computer, the computer further adapted to:

analyse the contents of at least one defined region of the captured screen contents to produce a value for the region, process the value to determine a content event, select an effects script based on the determined event, the effects script not being embedded in the computer code generating the screen contents, provide the selected effects script to the at least one ambient effects device, and operate the at least one ambient effects device according to the effects script to render ambient effects.

11. A method for providing ambient effects in relation to displayed media content, comprising:
   a) capturing in a buffer memory of a computer screen contents for display, the screen contents generated by computer code of a computer game being executed on the computer,
   b) analyzing the contents of at least one defined region of the captured screen contents to produce a value for the region,
   c) processing the value to determine a content event,
   d) generating an effects script based on the determined content event, and
   e) providing the generated effects script to at least one of a plurality of devices contributing to make up an ambient environment, and
   f) operating the devices according to the effects script to render ambient effects.

* * * * *